United States Patent
Yasuda et al.

(10) Patent No.: US 6,864,338 B2
(45) Date of Patent: Mar. 8, 2005

(54) STERICALLY REGULATED METHACRYLIC POLYMER AND PROCESS FOR PRODUCING THE SAME

(75) Inventors: Hajime Yasuda, Higashihiroshima (JP); Yuushou Nakayama, Higashihiroshima (JP); Michiharu Yamamoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/370,934

(22) Filed: Feb. 20, 2003

(65) Prior Publication Data

US 2003/0162921 A1 Aug. 28, 2003

(30) Foreign Application Priority Data

Feb. 26, 2002 (JP) ........................................ 2002-049042

(51) Int. Cl.[7] ............................................. C08F 120/18
(52) U.S. Cl. .................... 526/329.7; 526/126; 526/170; 526/259; 526/326
(58) Field of Search ............................... 526/126, 170, 526/259, 326, 329.7

(56) References Cited

U.S. PATENT DOCUMENTS 5,116,911 A * 5/1992 Leyrer et al. ............ 525/329.9

FOREIGN PATENT DOCUMENTS

| JP | 62-70408 | | 3/1987 |
|---|---|---|---|
| JP | 62-070408 | * | 3/1987 |
| JP | 3-263412 | | 11/1991 |
| JP | 10-265517 | | 10/1998 |
| JP | 10-333195 | | 12/1998 |

OTHER PUBLICATIONS

Keyanpour–Rad et al. Macromolecules (1978), 11(6), 1114–8.*
Vyprachticky et al. Macromol et al. Chem. Phys., (1999), 200(3), 580–586.*
Cho et al. Polymer Preprints (2000), 41(2), 1223–1224.*
John C. Jansen, et al., Synthesis and characterization of novel side–chain liquid polycarbonates, 4. Synthesis of side–chain liquid crystalline polycarbonates with mesogenic groups having tails of different lengths, Macromolecular Chemistry and Physics, vol. 200, Issue 6 pp. 1407–1420, Nov. 20, 1998.

George J. Jiang, et al., Polymerization of methyl methacrylate using a metallocene catalyst system, Journal of Polymer Science Part A: Polymer Chemistry, vol. 38, Issue 7, pp. 1184–1194, Jan. 5, 2000.
O. Hampel, et al., New Derivatives of Quinoxaline—Syntheses, Complex Formalation and their Application as Controlling Ligands for Zinc Catalyzed Epoxide–$CO_2$–Copolymerization, 2002 Verlag der Zeitschrift für Naturforschung, Tübingen, pp. 946–956.
P.L. Watson, et al., Homogeneous Lanthanide Complexes as Polymerization and Oligomerization Catalysts: Mechanistic Studies, 1983 American Chemical Society, pp. 459–479.
William J. Evans, et al., Organolanthanide Hydride Chemistry. 3. Reactivity of Low–Valent Samarium with Unsaturated Hydrocarbons Leading to a Structurally Characterized Samarium Hydride Complex, American Chemical Society, 1983, 105, 1401–1403.
Kazuo Soga, et al., Stereospecific Polymerization of Methyl Methacrylate Initiated by Dimethylzirconocene/$B(C_6F_5)_3$(or $Ph_3CB(C_6F_5)_4$)/$Zn(C_2H_5)_2$, American Chemical Society, 1994, 27, 7938–7940.
Colin Eaborn, et al., A Monomeric Solvent–Free Bent Lanthanide Dialkyl and a Lanthanide Analogue of a Grignard Reagent. Crystal Structures of $Yb\{C(SiMe_3)\}_w$ and $[Yb\{C(SiMe_3)\}I\ OEt_2]_2$, American Chemical Society, 1994, 116, 12071–12072.
Gerald Jeske, et al., Highly Reactive Organolanthanides. Systematic Routes to and Olefin Chemistry of Early and Late Bis(pentamethylcylopentadieny/) 4f Hydrocarbyl and Hydride Complexes, American Chemical Society, 1985, 107, 8091–8103.

* cited by examiner

Primary Examiner—Helen L. Pezzuto
(74) Attorney, Agent, or Firm—Knobbe Martens Olson & Bear, LLP (57) ABSTRACT

This invention provides a high-molecular-weight, sterically regulated methacrylic polymer having high stereoregularity, a narrow distribution of molecular weights, and a high molecular weight, comprising methacrylates as units containing triphenyl amino groups etc. in side chains. The sterically regulated methacrylic polymer comprises 50 to 100 mol-% unit based on methacrylate (1) having a tertiary amino group bound to at least two aromatic rings in a side chain, wherein the number-average molecular weight (Mn) is 5000 to 2000000, the poly dispersity coefficient (Mw/Mn) is 1 to 1.5, and the syndiotacticity of the methacrylic polymer is 70% or more in 2-units expression (%rr).

10 Claims, 5 Drawing Sheets

STERICALLY REGULATED METHACRYLIC POLYMER AND PROCESS FOR PRODUCING THE SAME

BACKGROUND OF THE INVENTION

1. Field of the Invention

This invention relates to a sterically regulated methacrylic polymer and a process for producing the same. The sterically regulated methacrylic polymer of the invention is a homopolymer or copolymer of methacrylates containing units based on methacrylates each having a tertiary amino group bound to at least two aromatic rings, and has a narrow molecular weight distribution and highly syndiotactic or isotactic linkages. The sterically regulated methacrylic polymer of the invention is useful as a hole-mobile polymer and can be used in an electroluminescence material, photorefractive material etc.

2. Description of the Related Art

It is known that a highly sterically regulated polymer can be obtained from methyl methacrylate which is a typical methacrylate type by low-temperature radical polymerization or low-temperature anionic polymerization. It is known that the methacrylic polymer thus obtained has higher stereoregularity and a narrower distribution of molecular weights than those of methacrylic polymers synthesized by usual radical polymerization, is excellent in moldability, and has specific characteristics.

Heretofore, the stereoregular polymerization of methyl methacrylate has been extensively studied. For example, when methyl methacrylate is polymerized by adding $ZrMe_2$ (in this specification, Me refers to $CH_3$) or $Zr(C_2H_5)_2$ and $B(C_6F_5)_3$ to ethylene bisindenyl, a highly isotactic polymer is obtained, but its number-average molecular weight is as low as 20,000 and the yield is also as low as 38% (K. Soga, H. Deng, T. Yano, T. Shion, Macromolecules, 27, 7938, 1994). Further, a method of using a Grignard reagent, a method of using lithium as an initiator in liquid ammonia, and a method of using 1,1-diphenylhexyl lithium are known. In these methods, relatively monodisperse (Mw/Mn~about 1.5) poly(methyl methacrylate) can be obtained, but these methods are insufficient to prepare the polymer having a high molecular weight, a narrower distribution of molecular weights, and high tacticity.

Various studies have been made to solve the problem described above. For example, use of a trivalent lanthanoid complex as a catalyst for polymerization of methyl (meth)acrylate has been disclosed in recent years by Yasuda et al. (JP-A 3-263412). In this method, poly(meth)acrylic ester having a very narrow dispersion degree of 1.04, a high molecular weight (Mn=194000) and 80% or more syndiotacticity in 3-units expression (%rr) can be produced in 98% yield.

Yasuda et al. have also disclosed e.g. $M[C(SiR)_3]_n$ (M is a rare earth element, R is a hydrogen atom, an alkyl group, an aryl group, a cycloalkyl group or an arylalkyl group, and n is 2 or 3) as a polymerization catalyst giving polymethacrylate having high stereoregularity, a narrow distribution of molecular weights and high isotacticity (JP-A 10-265517).

On one hand, a polymer containing a triphenyl amino group in a side chain is an excellent organic photoconductive (specifically highly hole-mobile) material and is thus noted in recent years as an optoelectronics organic polymer material. For example, as disclosed in JP-A 10-333195, the polymer containing a triphenyl amino group in a side chain has been revealed in recent years to give excellent hole mobility.

The polymer giving such hole mobility is known to be applicable to electrophotographic radiation sensitive materials, electroluminescence materials and photorefractive materials. However, a process for efficiently producing methacrylic polymers having high stereoregularity and a narrower distribution of molecular weights and containing a high-molecular-weight triphenyl amino group in a side chain is not known until now.

SUMMARY OF THE INVENTION

An object of this invention is to provide a sterically regulated methacrylic polymer having high stereoregularity and a high molecular weight, comprising methacrylates as units containing triphenyl amino groups etc. in side chains.

Another object of this invention is to provide a process for producing a sterically regulated methacrylic polymer having high stereoregularity, comprising methacrylates as units containing triphenyl amino groups etc. in side chains.

As a result of eager study for solving the problem described above, the present inventors found a sterically regulated methacrylic polymer and a process for producing the same, as described below, to complete this invention.

That is, this invention relates to a sterically regulated methacrylic polymer (methacrylic syndiotactic polymer (I)) comprising 50 to 100 mol-% unit based on methacrylate (1) having a tertiary amino group bound to at least two aromatic rings in a side chain, wherein the number-average molecular weight (Mn) is 5000 to 2000000, the poly dispersity coefficient (Mw/Mn) is 1 to 1.5, and the syndiotacticity of the methacrylic polymer is 70% or more in 3-units expression (%rr).

The number-average molecular weight (Mn) of the methacrylic syndiotactic polymer (I) of the invention having a unit based on methacrylate (1) is 5000 to 2000000, indicating that this polymer has a high molecular weight. The poly dispersity coefficient (Mw/Mn), that is, the ratio of the weight-average molecular weight (Mw) to the number-average molecular weight (Mn), is from 1 to 1.5, indicating a narrow distribution of molecular weights. The poly dispersity coefficient (Mw/Mn) is preferably from 1 to 1.2 for a narrower distribution of molecular weights. The number-average molecular weight and weight-average molecular weight are molecular weights determined by gel permeation chromatography (GPC, solvent: tetrahydrofuran) with poly (methyl methacrylate) standards of known molecular weights. The method will be described in more detail in the Examples.

The syndiotacticity of the methacrylic syndiotactic polymer (I) is 70% or more in 2-units expression (%r), indicating high stereoregularity. The syndiotacticity is preferably 80% or more in 2-units expression (%r). The syndiotacticity is determined by $^{13}C$-NMR. The method will be described in more detail in the Examples.

Further, this invention relates to a process for producing a sterically regulated methacrylic polymer, which comprises polymerizing a methacrylic monomer containing methacrylate (1) having a tertiary amino group bound to at least two aromatic rings in a side chain, in the presence of an organometallic catalyst represented by the general formula (2):

wherein $M^1$ represents Sc, Y or a lanthanide atom, and $R^2$ and $R^3$ independently represent a hydrogen atom, a $C_{1-5}$ hydrocarbon group, or a $C_{1-5}$ hydrocarbon group containing a silicon atom.

According to coordinated anionic polymerization with the organometallic catalyst represented by the general formula (2) above, the sterically regulated methacrylic polymer can be produced. The process described above is suitable particularly for producing a highly syndiotactic, sterically regulated methacrylic polymer having 50% or more syndiotacticity. According to this process, for example the methacrylic syndiotactic polymer (I) described above can be produced.

Further, this invention relates to a sterically regulated methacrylic polymer (methacrylic isotactic polymer (II)) comprising 50 to 100 mol-% unit based on methacrylate (1) having a tertiary amino group bound to at least two aromatic rings in a side chain, wherein the number-average molecular weight (Mn) is 5000 to 2000000, and the isotacticity of the methacrylic polymer is 70% or more in 2-units expression (%m).

The number-average molecular weight (Mn) of the methacrylic isotactic polymer (II) of the invention having a unit based on methacrylate (1) is 5000 to 2000000, indicating that this polymer has a high molecular weight. The number-average molecular weight is a molecular weight determined by gel permeation chromatography (GPC, solvent: tetrahydrofuran) with poly(methyl methacrylate) standards of known molecular weights. The method will be described in more detail in the Examples.

The isotacticity of the methacrylic isotactic polymer (II) is 70% or more in 2-units expression (%m), indicating high stereoregularity. The isotacticity is preferably 80% or more in 2-units expression (%m). The isotacticity is determined by $^{13}$C-NMR. The method will be described in more detail in the Examples.

Further, this invention relates to a process for producing a sterically regulated methacrylic polymer, which comprises polymerizing a methacrylic monomer containing methacrylate (1) having a tertiary amino group bound to at least two aromatic rings in a side chain, in the presence of an organometallic catalyst represented by the general formula (3):

$$M^2[C(Si(R^4)_3)_3]_2$$

wherein $M^2$ represents Sc, Y or a lanthanide atom, and $R^4$ groups independently represent a hydrogen atom or a $C_{1-5}$ hydrocarbon group.

According to coordinated anionic polymerization with the organometallic catalyst represented by the general formula (3) above, the sterically regulated methacrylic polymer can be produced. The process described above is suitable particularly for producing the highly isotactic, sterically regulated methacrylic polymer having 50% or more isotacticity. According to this process, for example the methacrylic isotactic polymer (II) described above can be produced.

As the methacrylate (1) used in the sterically regulated methacrylic polymer of the invention or in the process for producing the same, it is preferable to use at least one member of methacrylates represented by the general formula (1):

wherein n is an integer of 1 to 12, X is —O— or a single bond, and $R^1$ groups independently represent a hydrogen atom, a $C_{1-12}$ alkyl group, or an alkyl ether group containing a $C_{1-12}$ alkyl group.

DETAILED DESCRIPTION OF THE INVENTION

The sterically regulated methacrylic polymers {methacrylic syndiotactic polymer (I) and methacrylic isotactic polymer (II)} of the invention comprise the methacrylate (1) as the unit. As the methacrylate (1), the one having a tertiary amino group bound to at least two aromatic rings in a side chain can be used without particular limitation. The tertiary amino group possessed by the methacrylate (1) includes, for example, a carbazole group, triphenyl amino group, tetraphenyl diamino biphenyl group etc. The methacrylate (1) includes compounds represented by the general formula (1):

-continued wherein n is an integer of 1 to 12, X represents —O— or a single bond, and $R^1$ groups independently represent a hydrogen atom, a $C_{1-12}$ alkyl group, or an alkyl ether group containing a $C_{1-12}$ alkyl group. The alkyl group may be branched or linear.

Examples of the methacrylate (1) represented by the general formula (1) include, for example, carbazoylpropyl methacrylate, carbazoylethyl methacrylate, carbazoylhexyl methacrylate, carbazoyllauryl methacrylate, 4-(N,N-diphenylamino)-phenyloxypropyl methacrylate, N-(methacryloyloxypropyloxyphenyl)-N,N',N'-triphenyl-(1,1'-diphenyl)-4,4'-diamine, N-(methacryloyloxypropyloxyphenyl)-N-phenyl-N',N'-bis(4-methylphenyl)-(1,1'-diphenyl)-4,4'-diamine, and N-(methacryloyloxypropyloxyphenyl)-N'-phenyl-N,N'-bis(4-butoxyphenyl)-(1,1'-diphenyl)-4,4'-diamine. These can be used singly or in combination thereof.

The sterically regulated methacrylic polymer of the invention may be a homopolymer of the methacrylate (1) or a copolymer containing 50 mol-% or more unit based on the methacrylate (1) and another methacrylate as the unit. Another methacrylate is not particularly limited, and examples thereof include alkyl methacrylates whose alkyl group contains 1 to 12 carbon atoms. The alkyl group may be linear or branched. The alkyl methacrylates include, for example, methyl methacrylate, ethyl methacrylate, n-propyl methacrylate, isopropyl methacrylate, t-butyl methacrylate, n-hexyl methacrylate, cyclohexyl methacrylate, n-octyl methacrylate, isooctyl methacrylate, 2-ethylhexyl methacrylate, and decyl methacrylate. Other methacrylates include those having, as an ester group, an aryl group, an alicyclic hydrocarbon group and various hydrocarbon groups containing a halogen atom, a nitrogen atom, an oxygen atom etc. These can be used singly or in combination thereof.

The methacrylic syndiotactic polymer (I) of the invention can be produced for example by polymerizing a methacrylic monomer containing the methacrylate (1), in the presence of an organometallic catalyst represented by the general formula (2):

wherein $M^1$ represents Sc, Y or a lanthanide atom, and $R^2$ and $R^3$ independently represent a hydrogen atom, a $C_{1-5}$ hydrocarbon group, or a $C_{1-5}$ hydrocarbon group containing a silicon atom. In polymerization of the methacrylic monomer, the methacrylate (1) may be homopolymerized, or methacrylic monomers containing the methacrylate (1) and other methacrylates may be copolymerized.

As the organometallic catalyst represented by the general formula (2) above, the one having the above structure can be used without particular limitation. In the presence of a solvent, the organometallic catalyst represented by the general formula (2) is used as a complex structure represented by the formula:

wherein $M^1$, $R^2$ and $R^3$ have the same meaning as defined above, D is a solvent molecule, and m is an integer of 0 to 3, or in the absence of a solvent, the organometallic catalyst is used as a dimerized complex structure represented by the formula:

wherein $M^1$, $R^2$ and $R^3$ have the same meaning as defined above.

Examples of the lanthanide atom in the organometallic catalyst represented by the general formula (2) include, for example, La, Ce, Pr, Nd, Pm, Sm, Eu, Gd, Tb, Dy, Ho, Er, Tm, Yb, Lu etc. $M^1$ is preferably Sm. The $C_{1-5}$ hydrocarbon group represented by $R^2$ and $R^3$ includes linear or branched alkyl groups such as a methyl group, ethyl group, propyl group, butyl group and t-butyl group.

As the organometallic catalyst represented by the general formula (2) above, those compounds satisfying the above structural formula can be used without particular limitation. Examples thereof include biscyclopentadienyl lutetium hydride, biscyclopentadienyl lutetium methyl, biscyclopentadienyl lutetium bistrimethyl silylmethyl, bispentamethyl cyclopentadienyl lutetium hydride, bispentamethyl cyclopentadienyl lutetium methyl, bispentamethyl cyclopentadienyl lutetium bistrimethyl silylmethyl, biscyclopentadienyl ytterbium hydride, biscyclopentadienyl ytterbium methyl, biscyclopentadienyl ytterbium bistrimethyl silylmethyl, bispentamethyl cyclopentadienyl ytterbium hydride, bispentamethyl cyclopentadienyl ytterbium methyl, bispentamethyl cyclopentadienyl ytterbium bistrimethyl silylmethyl, biscyclopentadienyl samarium hydride, biscyclopentadienyl samarium methyl, biscyclopentadienyl samarium bistrimethyl silylmethyl, bispentamethyl cyclopentadienyl samarium hydride, bispentamethyl cyclopentadienyl samarium methyl, bispentamethyl cyclopentadienyl samarium bistrimethyl silylmethyl, biscyclopentadienyl europium hydride, biscyclopentadienyl europium methyl, biscyclopentadienyl europium bistrimethyl silylmethyl, bispentamethyl cyclopentadienyl europium hydride, bispentamethyl cyclopentadienyl europium methyl, bispentamethyl cyclopentadienyl europium bistrimethyl silylmethyl, biscyclopentadienyl scandium hydride, biscyclopentadienyl scandium methyl, biscyclopentadienyl scandium bistrimethyl silylmethyl, bispentamethyl cyclopentadienyl scandium hydride, bispentamethyl cyclopentadienyl scandium methyl, bispentamethyl cyclopentadienyl scandium bistrimethyl silylmethyl, bis[bis(trimethylsilyl)cyclopentadienyl] lutetium hydride, bis[bis(trimethylsilyl)cyclopentadienyl] lutetium methyl, bis[bis(trimethylsilyl)cyclopentadienyl] lutetium bistrimethyl silylmethyl, bis[(trimethylsilyl)cyclopentadienyl]lutetium hydride, bis[(trimethylsilyl)pentadienyl]lutetium methyl, bis[(trimethylsilyl)cyclopentadienyl]lutetium bistrimethyl silylmethyl, bis[bis(trimethylsilyl)cyclopentadienyl]ytterbium hydride, bis[bis(trimethylsilyl)cyclopentadienyl]ytterbium methyl, bis[bis(trimethylsilyl)cyclopentadienyl]ytterbium bistrimethyl silylmethyl, bis[(trimethylsilyl)cyclopentadienyl]ytterbium hydride, bis[(trimethylsilyl)cyclopentadienyl]ytterbium methyl, bis[(trimethylsilyl)cyclopentadienyl]ytterbium bistrimethyl silylmethyl, bis[bis(trimethylsilyl)cyclopentadienyl]samarium hydride, bis[bis(trimethylsilyl)cyclopentadienyl]samarium methyl, bis[bis(trimethylsilyl)cyclopentadienyl]samarium bistrimethyl silylmethyl, bis[(trimethylsilyl)cyclopentadienyl]samarium hydride, bis[(trimethylsilyl)cyclopentadienyl]samarium methyl, bis[(trimethylsilyl)cyclopentadienyl]samarium bistrimethyl silylmethyl, bis[bis(trimethylsilyl)cyclopentadienyl]europium hydride, bis[bis(trimethylsilyl)cyclopentadienyl]europium methyl, bis[bis(trimethylsilyl)cyclopentadienyl]europium bistrimethyl silylmethyl, bis[(trimethylsilyl)cyclopentadienyl]europium hydride, bis[(trimethylsilyl)cyclopentadienyl]europium methyl, bis[(trimethylsilyl)cyclopentadienyl]europium bistrimethyl silylmethyl, bis[bis(trimethylsilyl)pentadienyl]scandium hydride, bis[bis(trimethylsilyl)cyclopentadienyl]scandium methyl, bis[bis(trimethylsilyl)cyclopentadienyl]scandium bistrimethyl silylmethyl, bis[(trimethylsilyl)cyclopentadienyl]scandium hydride, bis[(trimethylsilyl)cyclopentadienyl]scandium methyl, bis[(trimethylsilyl)cyclopentadienyl]scandium bistrimethyl silylmethyl and the like.

The method of producing an organometallic compound represented by the general formula (2) is not particularly limited. The organometallic compound can be produced by known methods described in e.g. Journal of the American Chemical Society, Tobin J. Marks, 107: 8091, 1985, Journal of the American Chemical Society, William J. Evans, 105: 1401, 1983, American Chemical Society Symposium, P. L. Watson, p. 495, 1983, and WO86/05788 (Tobin J. Marks), JP-A 3-263412 and JP-A 6-256419.

The amount of the organometallic catalyst represented by the general formula (2) is not particularly limited, and can be suitably regulated depending on the molecular weight of the methacrylic syndiotactic polymer (I). Usually, the amount of the catalyst is preferably about 0.001 to 100 mmol, more preferably 0.01 to 10 mmol, per mole of the methacrylic monomer. In an amount of less than 0.001 mmol, the polymerization activity is easily lowered, while in an amount of higher than 100 mmol, the molecular weight of the polymer formed is decreased and the desired physical properties are hardly obtained.

Polymerization of the methacrylic monomer is carried out in a solvent in an inert gas atmosphere. The inert gas includes, but is not limited to, nitrogen, argon and helium. For easy replacement of gas in the polymerization unit, argon is preferable. The solvent includes, for example, aromatic hydrocarbons such as benzene, toluene and xylene; aliphatic hydrocarbons such as hexane and heptane; alicyclic hydrocarbons such as cyclohexane and cycloheptane; hydrocarbon halides such as methylene chloride and carbon tetrachloride; ethers such as tetrahydrofuran and diethyl ether; and esters such as ethyl acetate. To give high syndiotacticity, non-polar solvents such as toluene and xylene are preferably used. The solvent is preferably the sufficiently dehydrated and degassed one. The amount of the solvent used is not particularly limited, but the solvent is used preferably in a ratio of 10 to 500 parts by volume, more preferably 100 to 200 parts by volume, to 10 parts by volume of the starting methacrylic monomer.

The polymerization may be carried out by adding the organometallic compound represented by the general formula (2) to a solvent containing the methacrylic monomer, or by adding the methacrylic monomer to a solvent containing the organometallic compound represented by the general formula (2), or with a solvent containing the methacrylic monomer and the organometallic compound represented by the general formula (2).

It is desired that the methacrylic monomer is dissolved in the solvent, sufficiently dried by a drying agent such as molecular sieves, and used after the drying agent is removed just before polymerization. It is also desired that the organometallic compound is previously dissolved in the solvent before the starting methacrylic monomer is polymerized.

In the polymerization described above, the polymerization temperature is not particularly limited, but when a solvent is used, the temperature is controlled between the melting point and boiling point of the solvent. Usually, the polymerization temperature is set preferably at about −100 to 100° C. The polymerization temperature is more preferably −100 to 50° C., still more preferably −100 to 25° C. When the polymerization temperature is too low, the viscosity of the polymerization solvent may be increased thus making it difficult to regulate the polymerization. On the other hand, when the polymerization temperature is too high, the reaction temperature may arrive at the boiling point of the polymerization solvent or thereabout, thus making it difficult to regulate the polymerization. The polymerization can be carried out at normal pressures or under pressure. Usually, the polymerization pressure is preferably about 1 to 50 atmospheric pressure. The pressure is more preferably 1 to 5 atmospheric pressure. The polymerization time can be regulated suitably depending on the molecular weight of the methacrylic syndiotactic polymer (I). Usually, the total polymerization time is 10 minutes to 100 hours. The polymerization time is preferably 3 hours to 30 hours.

The methacrylic isotactic polymer (II) of the invention can be produced for example by polymerizing a methacrylic monomer containing the methacrylate (1), in the presence of an organometallic catalyst represented by the general formula (3):

$$M^2[C(Si(R^4)_3)_3]_2$$

wherein $M^2$ represents Sc, Y or a lanthanide atom, and $R^4$ groups independently represent a hydrogen atom or a $C_{1-5}$ hydrocarbon group. In polymerization of the methacrylic monomer, the methacrylate (1) may be homopolymerized, or methacrylic monomers containing the methacrylate (1) and other methacrylates may be copolymerized.

The organometallic catalyst represented by the general formula (3) is specifically represented by the formula:

wherein $M^2$ represents Sc, Y or a lanthanide atom, and $R^4$ groups independently represent a hydrogen atom or a $C_{1-5}$ hydrocarbon group.

Examples of $M^2$ (lanthanide atom) in the organometallic catalyst represented by the general formula (3) include, for example, La, Ce, Pr, Nd, Pm, Sm, Eu, Gd, Tb, Dy, Ho, Er, Tm, Yb, Lu etc. $M^2$ is preferably Yb. The $C_{1-5}$ hydrocarbon group represented by $R^4$ includes linear or branched alkyl groups such as a methyl group, ethyl group, propyl group, butyl group and t-butyl group. For availability of the starting material and higher activity, $R^4$ is preferably a methyl group. For availability of the starting material and higher activity, the most preferable combination of $M^2$ are $R^4$ is that $M^2$ is Yb and every $R^4$ is a methyl group.

The organometallic catalyst represented by the general formula (3) can be used without particular limitation insofar as it is a compound satisfying the above structural formula. Examples of the organometallic catalyst include bis{tris(trimethylsilyl)methyl}ytterbium, bis{tris(triethylsilyl)methyl}ytterbium, bis{tris(tripropylsilyl)methyl}ytterbium, bis{tris(tributylsilyl)methyl}ytterbium, bis{tris(trimethylsilyl)methyl}samarium, bis{tris(triethylsilyl)methyl}samarium, bis{tris(tripropylsilyl)methyl}samarium, bis{tris(tributylsilyl)methyl}samarium, bis{tris(trimethylsilyl)methyl}lutetium, bis{tris(triethylsilyl)methyl}lutetium, bis{tris(tripropylsilyl)methyl}lutetium, bis{tris(tributylsilyl)methyl}lutetium, bis{tris(trimethylsilyl)methyl}europium, bis{tris(triethylsilyl)methyl}europium, bis{tris(tripropylsilyl)methyl}europium, bis{tris(tributylsilyl)methyl}europium, bis{tris(trimethylsilyl)methyl}yttrium, bis{tris(triethylsilyl)methyl}yttrium, bis{tris(tripropylsilyl)methyl}yttrium, bis{tris(tributylsilyl)methyl}yttrium and the like.

The method of producing an organometallic compound represented by the general formula (3) is not particularly limited. For example, the organometallic compound can be synthesized by known methods (Colin Eaborn, Peter B. Hitchcock, Kenith Izod, J. David Smith, J. Am. Chem. Soc. 116, 12071, 1994) or methods described in JP-A 10-265517 etc.

The amount of the organometallic catalyst represented by the general formula (3) is not particularly limited, and can be suitably regulated depending on the molecular weight of the methacrylic isotactic polymer (II). Usually, the amount of the catalyst is preferably about 0.001 to 100 mmol, more preferably 0.01 to 10 mmol, per mole of the methacrylic monomer. In an amount of less than 0.001 mmol, the polymerization activity is easily lowered, while in an amount of higher than 100 mmol, the molecular weight of the polymer formed is decreased and the desired physical properties are hardly obtained.

Polymerization of the methacrylic monomer is carried out preferably in a solvent in an inert gas atmosphere. The inert gas includes, but is not limited to, nitrogen, argon and helium. For easy replacement of gas in the polymerization unit, argon is preferable. The solvent includes, for example, aromatic hydrocarbons such as benzene, toluene and xylene; aliphatic hydrocarbons such as hexane and heptane; alicyclic hydrocarbons such as cyclohexane and cycloheptane; hydrocarbon halides such as chloroform, methylene chloride and carbon tetrachloride; ethers such as tetrahydrofuran and diethyl ether; and esters such as ethyl acetate. To give high isotacticity, non-polar solvents such as toluene and xylene are preferably used. The amount of the solvent used is not particularly limited, but the solvent is used preferably in a ratio of 10 to 500 parts by volume, more preferably 100 to 200 parts by volume, to 10 parts by volume of the starting methacrylic monomer.

The polymerization may be carried out by adding the organometallic compound represented by the general formula (3) to a solvent containing the methacrylic monomer, or by adding the methacrylic monomer to a solvent containing the organometallic compound represented by the general formula (3), or with a solvent containing the methacrylic monomer and the organometallic compound represented by the general formula (3).

It is desired that the methacrylic monomer is dissolved in the solvent, sufficiently dried by a drying agent such as molecular sieves, and used after the drying agent is removed just before polymerization. It is also desired that the organometallic compound is previously dissolved in the solvent before the starting methacrylic monomer is polymerized.

In the polymerization described above, the polymerization temperature is not particularly limited, but when a solvent is used, the temperature is controlled between the melting point and boiling point of the solvent. The polymerization temperature is usually set at about −100 to 40° C. The polymerization temperature is more preferably −78 to 0° C. When the polymerization temperature is too low, the rate of polymerization tends to be lowered. On the other hand, when the polymerization temperature is too high, the stereoregularity of the methacrylic isotactic polymer (II) is easily lowered.

The polymerization can be carried out at normal pressures or under pressure. Usually, the polymerization pressure is preferably about 1 to 50 atmospheric pressure. The pressure is more preferably 1 to 5 atmospheric pressure. The polymerization time can be regulated suitably depending on the molecular weight of the methacrylic isotactic polymer (II). Usually, the total polymerization time is 10 minutes to 100 hours. The polymerization time is preferably 3 hours to 30 hours.

The effect of the invention is as follows: The methacrylic syndiotactic polymer (I) that is the sterically regulated methacrylic polymer of the invention obtained in the manner described above has high stereoregularity, a high molecular weight and a narrow distribution of molecular weights. Further, the methacrylic isotactic polymer (II) has high stereoregularity and a high molecular weight. The sterically regulated methacrylic polymer of the invention gives high hole mobility, possibly because of its excellent stereoregularity. The reason for its excellent hole mobility is not evident, but it is estimated that π electrons in adjacent side chains overlap efficiently to give high hole mobility. By virtue of excellent hole mobility, it can be applied to high-response optoelectronics organic polymer materials such as electrophotographic radiation sensitive materials, electroluminescence materials and photorefractive materials.

EXAMPLES

Hereinafter, this invention is described in more detail by reference to the Examples, but this invention is not limited to the Examples.

The number-average molecular weight (Mn) and the poly dispersity coefficient (Mw/Mn) in the Examples were measured in tetrahydrofuran as the solvent at 40° C. by gel permeation chromatography (GPC) with SC-8010/TSK gel G2000, 3000, 4000 and 5000 columns produced by TOSOH CORPORATION. In the Examples, 2-units expression ([%r], [%m]) was calculated from the integration ratio of signals of linear and branched methyl groups by $^{13}$C-NMR by using JNM-LA400 produced by JEOL Ltd.

Synthesis Example 1

Synthesis of carbazoylpropyl methacrylate

Carbazole (16.7 g, 100 mmol) and 3-bromopropanol (15.3 g, 110 mmol) were dissolved in dimethylformamide (100 ml), and then t-butoxy potassium (12.3 g, 110 mmol) was added thereto, and the mixture was stirred at 50° C. for 12 hours. Water (100 ml) was added to this reaction solution, and the resulting compound was extracted with methylene chloride (200 ml). The methylene chloride layer was washed with water and dried over sodium sulfate anhydride, then the drying agent was removed, and the solvent was removed under reduced pressure, whereby a crude product was obtained. This crude product was purified by silica gel chromatography to give the desired intermediate carbazole alcohol.

The resultant carbazole alcohol (20.3 g, 90 mmol) was dissolved in dry tetrahydrofuran (100 ml) (referred to hereinafter as THF), and methacryloyl chloride (10.5 g, 100 mmol) and triethylamine (10.1 g, 100 mmol) were added dropwise thereto under cooling on ice. The mixture was returned to room temperature and allowed to react for 1 hour, and water was added to this reaction solution, and the resulting compound was extracted with diethyl ether (200 ml). The ether layer was washed with water and dried over sodium sulfate anhydride, then the drying agent was removed, and the solvent was removed under reduced pressure, whereby a crude product was obtained. This crude product was purified by silica gel chromatography to give the desired intermediate carbazolylpropyl methacrylate (19.5 g, 67% yield).

Synthesis Example 2

Synthesis of carbazoylethyl methacrylate

Carbazolylethyl methacrylate was synthesized in the same manner as in Example 1 except that 2-bromoethanol was used in place of 3-bromopropanol in Example 1.

Synthesis Example 3

Synthesis of carbazoylbutyl methacrylate

Carbazolylbutyl methacrylate was synthesized in the same manner as in Example 1 except that 4-bromobutanol was used in place of 3-bromopropanol in Example 1.

Synthesis Example 4

Synthesis of N-(methacryloyloxypropyloxyphenyl)-N,N', N'-triphenyl-(1,1'-diphenyl)-4,4-diamine: TPD methacrylate Diphenyl benzidine (33.6 g, 100 mmol) and iodobenzene (20.4 g, 100 mmol) and p-methoxy iodobenzene (23.4 g, 100 mmol) were dissolved in dodecane (300 ml), and potassium carbonate (69 g, 500 mmol) and cupper powder (1 g) were further mixed therewith, and the mixture was stirred for 3 days in an argon atmosphere at 200° C. After cooling, the solvent was distilled away under reduced pressure, and the residues were extracted with methylene chloride (300 ml). The methylene chloride layer was washed with water and dried over sodium sulfate anhydride, then the drying agent was removed, and the solvent was removed under reduced pressure, whereby a crude product was obtained. From this crude product, the desired intermediate triphenyl-methoxyphenyl benzidine only was isolated by silica gel chromatography.

The resulting triphenyl-methoxyphenyl benzidine (26.0 g, 50 mmol) was dissolved in dry THF (260 ml), and trimethylsilyl iodide (16 g, 80 mmol) was added thereto under cooling on ice, and after the mixture was reacted at 50° C. for 48 hours, water was added to the reaction solution, and the resulting compound was extracted with diethyl ether (300 ml). The ether layer was washed with water and dried over sodium sulfate anhydride, then the drying agent was removed, and the solvent was removed under reduced pressure, whereby a crude product was obtained. This crude product was purified by silica gel chromatography. The resulting intermediate was dissolved in dry THF (200 ml), and 3-bromopropanol (7.7 g, 55 mmol) and t-butoxy potassium (6.2 g, 55 mmol) were added thereto under cooling on ice, and the mixture was stirred at 50° C. for 12 hours. Water was added to this reaction solution, and the resulting compound was extracted with diethyl ether (200 ml). The ether layer was washed with water and dried over sodium sulfate anhydride, then the drying agent was removed, and the solvent was removed under reduced pressure, whereby a crude product was obtained. This crude product was purified by silica gel chromatography. The resulting triphenyl-hydroxypropyloxyphenyl benzidine (22.5 g, 40 mmol) was dissolved in dry THF (200 ml), and methacryloyl chloride (5.3 g, 50 mmol) and triethylamine (5.0 g, 50 mmol) were added dropwise thereto under cooling on ice. The mixture was returned to room temperature and allowed to react for 1 hour, and water was added to this reaction solution, and the resulting compound was extracted with diethyl ether (200 ml). The ether layer was washed with water and dried over sodium sulfate anhydride, then the drying agent was removed, and the solvent was removed under reduced pressure, whereby a crude product was obtained. This crude product was purified by silica gel chromatography to give the desired TPD methacrylate (18.3 g, 29% yield).

Synthesis Example 5

Synthesis of the organometallic catalyst represented by the general formula (2)

A 1 L flask flushed with argon was charged with 3.9616 g $SmI_2$ and 330 ml THF, and then 45.858 g pentamethyl cyclopentadienyl potassium salt (($C_5Me_5$)K) was added to the mixture under stirring, and the mixture was reacted at room temperature. Thereafter, THF was removed under reduced pressure, and toluene was added to the resulting solids, and the supernatant was recovered and dried under reduced pressure, and $(C_5Me_5)Sm(THF)_2$ was recrystallized from THF and hexane. The recrystallized $(C_5Me_5)Sm(THF)_2$, 2.5 g, was dissolved in 60 ml toluene, and 2.2 ml trimethyl aluminum was added thereto and reacted under stirring. The precipitates were removed and the supernatant was recrystallized, whereby $(C_5Me_5)SmMe_2AlMe_2$ was isolated. This product was recrystallized from THF and hexane to give $(C_5Me_5)SmMe(THF)$.

Synthesis of methacrylic syndiotactic polymer (I)

Example 1

A 200 ml flask flushed with argon was charged with 186 mg (0.336 mmol) of the organometallic catalyst (($C_5Me_5$) SmMe(THF)) prepared in Synthesis Example 5, 11.0 g (39.6 mmol) of carbazoylethyl methacrylate and 100 ml degassed and dehydrated THF, and the mixture was degassed and subjected to polymerization reaction at −20° C. for 24 hours. The reaction solution was dried to give 11.5 g methacrylic polymer (yield 99% or more).

Figure 1:
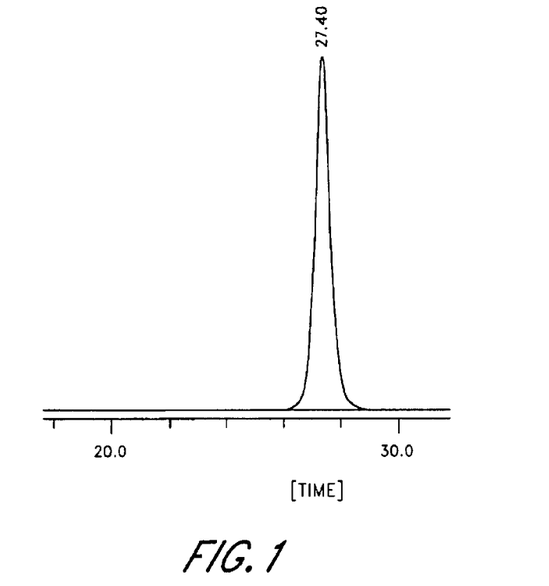
FIG. 1 is a GPC chart of the methacrylic polymer obtained in Example 1.
Figure 2:
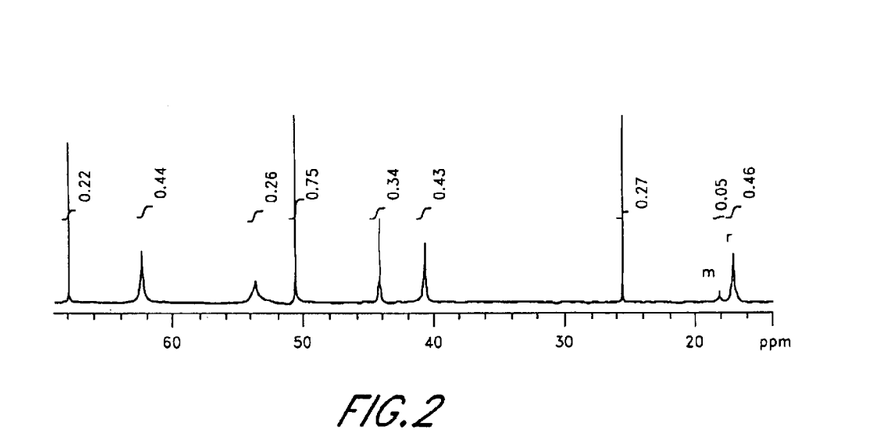
FIG. 2 is a $^{13}$C-NMR chart of the methacrylic polymer obtained in Example 1.

When the molecular weight of the resultant methacrylic polymer was measured by GPC, the weight-average molecular weight was 165,000, the number-average molecular weight was 162,000, and the poly dispersity coefficient was 1.02. The syndiotacticity of linkages in the methacrylic polymer was 90% in 2-units expression (%r). A GPC chart of the methacrylic polymer is shown in FIG. 1, and a $^{13}$C-NMR chart of the polymer in FIG. 2.

Example 2

A 200 ml flask flushed with argon was charged with 166 mg (0.327 mmol) of the organometallic catalyst (($C_5Me_5$) SmMe(THF)) prepared in Synthesis Example 5, 9.5 g (32.3 mmol) of carbazoylpropyl methacrylate and 100 ml degassed and dehydrated toluene, and the mixture was degassed and subjected to polymerization reaction at −20° C. for 24 hours The reaction solution was dried to give 9.9 g methacrylic polymer (yield 99%).

Figure 3:
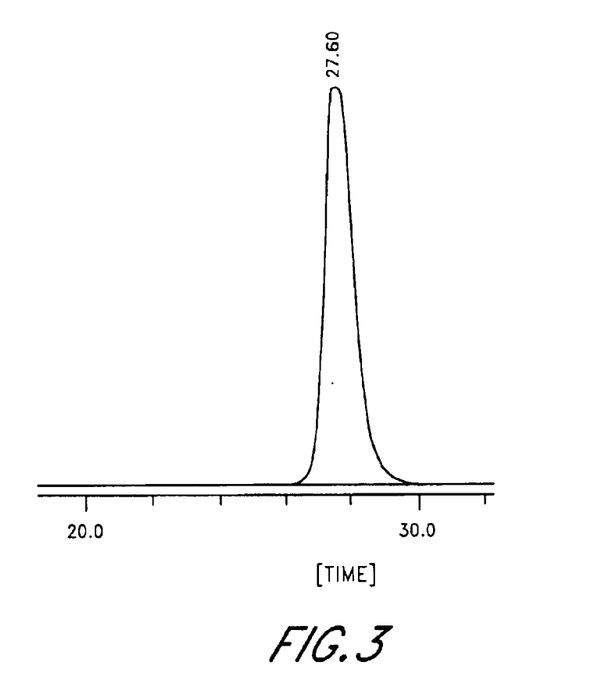
FIG. 3 is a GPC chart of the methacrylic polymer obtained in Example 2.
Figure 4:
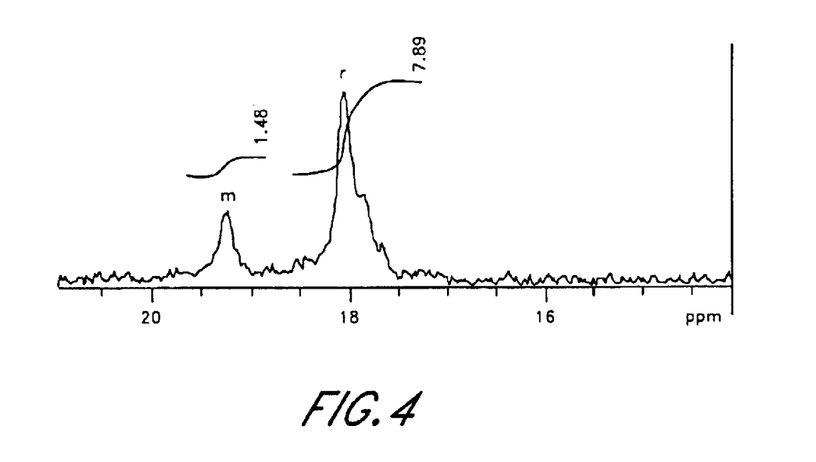
FIG. 4 is a $^{13}$C-NMR of the methacrylic polymer obtained in Example 2.

When the molecular weight of the resultant methacrylic polymer was measured by GPC, the weight-average molecular weight was 21,000, the number-average molecular weight was 19,000, and the poly dispersity coefficient was 1.07. The syndiotacticity of linkages in the methacrylic polymer was 84% in 2-units expression (%r). A GPC chart of the methacrylic polymer is shown in FIG. 3, and a $^{13}$C-NMR chart of the polymer in FIG. 4.

Example 3

A 200 ml flask flushed with argon was charged with 156 mg (0.311 mmol) of the organometallic catalyst (($C_5Me_5$) SmMe(THF)) prepared in Synthesis Example 5, 10 g (31.1 mmol) of carbazoylbutyl methacrylate and 100 ml degassed and dehydrated toluene, and the mixture was degassed and subjected to polymerization reaction at −20° C. for 24 hours. The reaction solution was dried to give 9.9 g methacrylic polymer (yield 39%).

Figure 5:
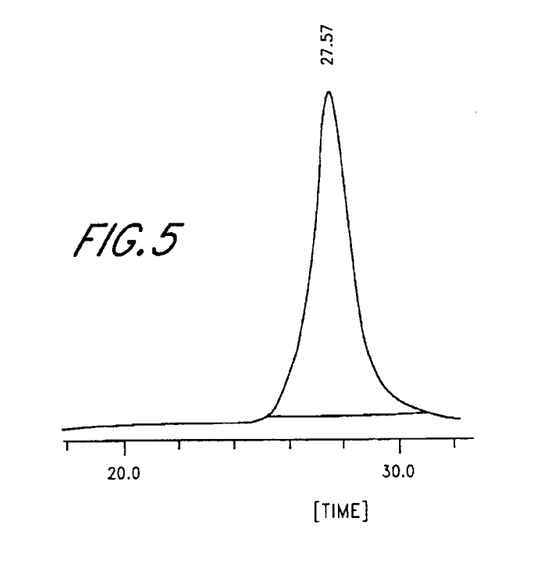
FIG. 5 is a GPC chart of the methacrylic polymer obtained in Example 3.
Figure 6:
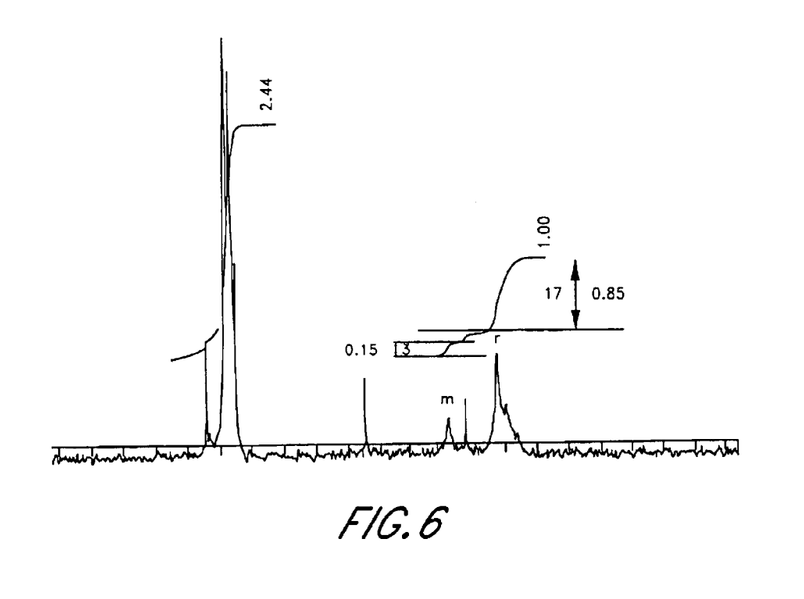
FIG. 6 is a $^{13}$C-NMR chart of the methacrylic polymer obtained in Example 3.

When the molecular weight of the resultant methacrylic polymer was measured by GPC, the weight-average molecular weight was 23,000, the number-average molecular weight was 18,000, and the poly dispersity coefficient was 1.29. The syndiotacticity of linkages in the methacrylic polymer was 85% in 2-units expression (%r). A GPC chart of the methacrylic polymer is shown in FIG. 5, and a $^{13}$C-NMR chart of the polymer in FIG. 6.

Example 4

A methacrylic polymer (yield 66%) was obtained in the same manner as in Example 2 except that 10 g TPD methacrylate prepared in Synthesis Example 4 was used in place of carbazoylpropyl methacrylate in Example 2.

Figure 7:
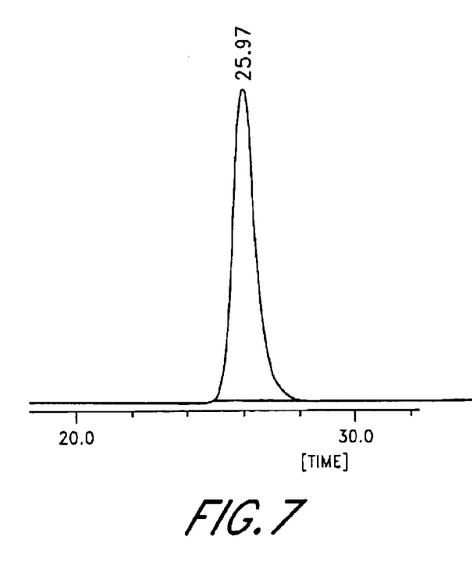
FIG. 7 is a GPC chart of the methacrylic polymer obtained in Example 4.
Figure 8:
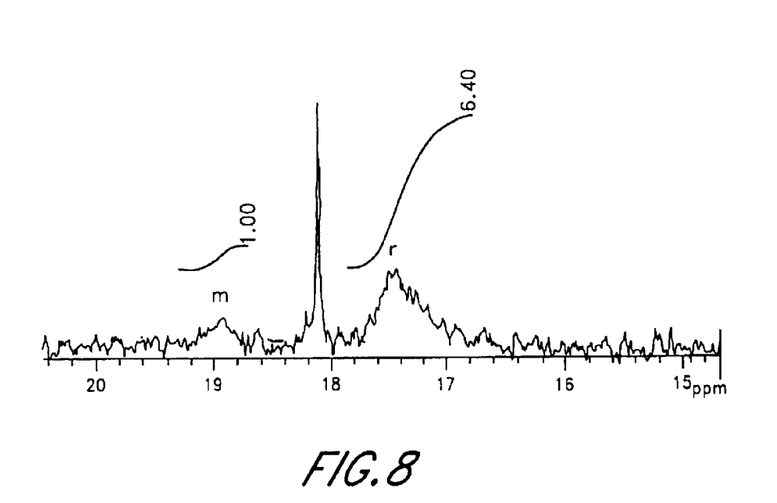
FIG. 8 is a $^{13}$C-NMR chart of the methacrylic polymer obtained in Example 4.

When the molecular weight of the resultant methacrylic polymer was measured by GPC, the weight-average molecular weight was 51,000, the number-average molecular weight was 48,000, and the poly dispersity coefficient was 1.07. The syndiotacticity of linkages in the methacrylic polymer was 86% in 2-units expression (%r). A GPC chart of the methacrylic polymer is shown in FIG. 7, and a $^{13}$C-NMR chart of the polymer in FIG. 8.

As is evident from the above results, a methacrylic polymer having a high molecular weight, a narrow distribution of molecular weights and highly syndiotactic methacrylic linkages can be obtained according to the polymerization methods in Examples 1 to 4.

Synthesis Example 6
Synthesis of the organometallic catalyst represented by the general formula (3)

A 500 ml flask flushed with argon was charged with 151 mmol lithium powder and 100 ml degassed and dried diethyl ether, and the system was cooled to −78° C. 41.2 mmol tristrimethylsilylmethyl iodide (IC(TMS)$_3$ where TMS is SiMe$_3$) dissolved in 90 ml diethyl ether was added slowly thereto under stirring.

The mixture was stirred at −78° C. for 6 hours and then stirred at 0° C. for 1 hour, and filtered through a glass wool in an argon stream. A solution of 45.9 mmol t-butoxy potassium in 90 ml diethyl ether was added to the filtrate at 0° C. After stirring for 12 hours, the solvent diethyl ether was distilled away, and the residues were washed 3 times with 30 ml degassed and dried hexane. The resultant white solids were dissolved in 90 ml degassed and dried benzene.

To this benzene solution was added 60 ml degassed and dried benzene solution containing 8.04 mmol ytterbium diiodide (YbI$_2$) separately synthesized. This solution was stirred at room temperature for 48 hours, and then the benzene was completely distilled away. After 120 ml dried and degassed hexane was added thereto, the supernatant was separated. This supernatant was concentrated to about ¼ and left at −20° C. for 24 hours, to give orange bis{tris(trimethylsilyl)methyl}ytterbium (yield 30%). Analysis of the resultant compound by $^1$H-NMR (C$_6$D$_6$, 25° C., 400 MHz) indicated δ 0.20 (s, 18H). Analysis of the compound by $^{13}$C-NMR (C$_6$D$_6$, 25° C., 100 MHz) indicated δ 6.17 (Me), δ 25.8 (SiC).

Synthesis of the methacrylic isotactic polymer (II)

Example 5

A 200 ml flask was flushed with an argon gas and then charged with 10.0 g (35.8 mmol) of carbazoylethyl methacrylate dissolved in 100 ml degassed and dried toluene, and the solution was cooled to −78° C. 0.358 mmol organometallic catalyst bis{tris(trimethylsilyl)methyl}ytterbium prepared in Synthesis Example 6 was added to the solution under stirring, and the mixture was stirred at 0° C. for 24 hours. The reaction solution was returned to room temperature and poured into methanol to terminate the polymerization, and the white precipitates were filtered off. The filtrate was dried under reduced pressure to give a methacrylic polymer (yield 94%).

Figure 9:
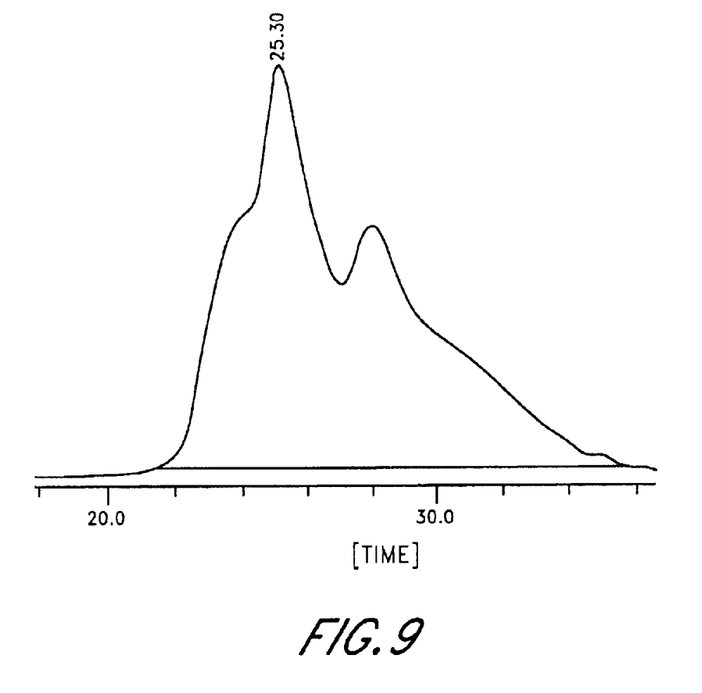
FIG. 9 is a GPC chart of the methacrylic polymer obtained in Example 5.
Figure 10:
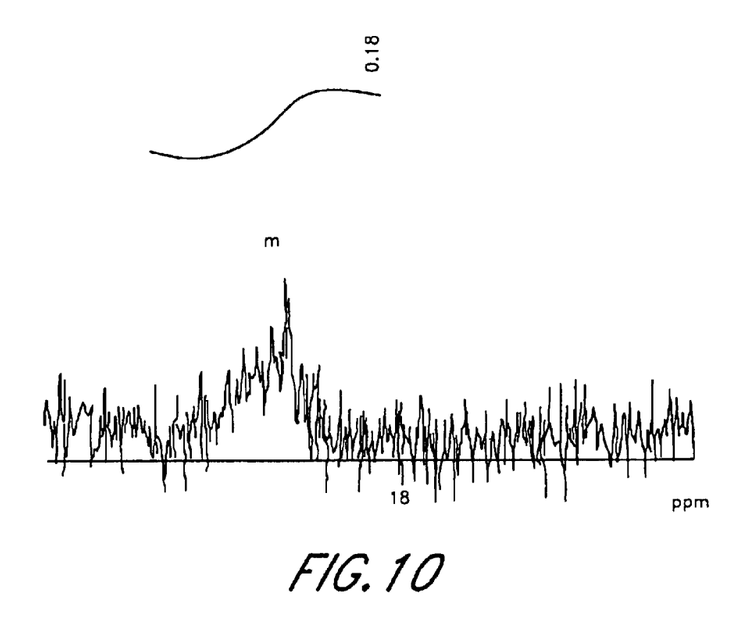
FIG. 10 is a $^{13}$C-NMR chart of the methacrylic polymer obtained in Example 5.

When the molecular weight of the resultant methacrylic polymer was measured by GPC, the number-average molecular weight was 6,700. The isotacticity of linkages in the methacrylic polymer was 90% or more in 2-units expression (%m). A GPC chart of the methacrylic polymer is shown in FIG. 9, and a $^{13}$C-NMR chart of the polymer in FIG. 10.

Comparative Example

A 30 ml flask was flushed with an argon gas and then charged with 2.7 g carbazoylpropyl methacrylate dissolved in 10 ml degassed and dried THF. 34 mg azobisisobutyronitrile was added to this solution and stirred at 70° C. for 4 hours. This solution was poured into 50 ml methanol to terminate the polymerization, and the precipitated polymer was dissolved in 100 ml chloroform. Further, 50 ml methanol was added slowly thereto stirring, and the white precipitates were filtered off. The filtrate was dried under reduced pressure to give a methacrylic polymer (yield 95%).

When the molecular weight of the resultant methacrylic polymer was measured by GPC, the weight-average molecular weight was 23,000, the number-average molecular weight was 129,000, and the poly dispersity coefficient was 5.58. This methacrylic polymer was completely a tactic without stereoregularity.

As is evident from the results described above, a methacrylic polymer having a high molecular weight, a narrow distribution of molecular weights and highly syndiotactic methacrylic linkages can be obtained according to the polymerization methods in Examples 1 to 4. Further, it can be seen that a methacrylic polymer having highly isotactic methacrylic linkages can be obtained by the polymerization method in Example 5. On the other hand, it can be seen that the polymer which can be produced by the conventional method shown in the Comparative Example is a low-molecular-weight and tacticity-free a tactic methacrylic polymer having a broad distribution of molecular weights.

What is claimed is:

1. A sterically regulated methacrylic polymer comprising 50 to 100 mol-% unit based on methacrylate (1) having a tertiary amino group bound to at least two aromatic rings in a side chain, wherein the number-average molecular weight (Mn) is 5000 to 2000000, the poly dispersity coefficient (Mw/Mn) is 1 to 1.5, and the syndiotacticity of the methacrylic polymer is 70% or more in 2-units expression (%r), wherein the methacrylate (1) is at least one member of methacrylates represented by the general formula (1):

-continued wherein n is an integer of 1 to 12, X represents —O— or a single bond, and $R^1$ groups independently represent a hydrogen atom, a $C_{1-12}$ alkyl group, or an alkyl ether group containing a $C_{1-2}$ alkyl group.

2. A process for producing a sterically regulated methacrylic polymer according to claim 1, which comprises polymerizing a methacrylic monomer containing said methacrylate (1), in the presence of an organometallic catalyst represented by the general formula (2):

$$(C_5(R^2)_5)_2M^1R^3$$

wherein $M^1$ represents Sc, Y or a lanthanide atom, and $R^2$ and $R^3$ independently represent a hydrogen atom, a $C_{1-5}$ hydrocarbon group, or a $C_{1-5}$ hydrocarbon group containing a silicon atom.

3. The process according to claim 2, wherein a highly syndiotactic, sterically regulated methacrylic polymer is produced.

4. The process for producing a sterically regulated methacrylic polymer according to claim 2, wherein the polymerization is carried out at a temperature of −100 to 100° C.

5. A sterically regulated methacrylic polymer comprising 50 to 100 mol-% unit based on methacrylate (1) having a tertiary amino group bound to at least two aromatic rings in a side chain, wherein the number-average molecular weight (Mn) is 5000 to 2000000, and the isotacticity of the methacrylic polymer is 70% or more in 2-units expression (%m), wherein the methacrylate (1) is at least one member of methacrylates represented by the general formula (1):

wherein n is an integer of 1 to 12, X represents —O— or a single bond, and $R^1$ groups independently represent a hydrogen atom, a $C_{1-12}$ alkyl group, or an alkyl ether group containing a $C_{1-12}$ alkyl group.

6. A process for producing a sterically regulated methacrylic polymer accordingly to claim 5, which comprises polymerizing a methacrylic monomer containing said methacrylate (1), in the presence of an organometallic catalyst represented by the general formula (3):

$$M^2[C(Si(R^4)_3)_3]_2$$

wherein $M^2$ represents Sc, Y or a lanthanide atom, and $R^4$ groups independently represent a hydrogen atom or a $C_{1-5}$ hydrocarbon group.

7. The process according to claim 6, wherein a highly isotactic, sterically regulated methacrylic polymer is produced.

8. The process for producing a sterically regulated methacrylic polymer according to claim 6, wherein the polymerization is carried out at a temperature of −100 to 40° C.

9. The process for producing a sterically regulated methacrylic polymer according to claim 3, wherein the polymerization is carried out at a temperature of −100 to 100° C.

10. The process for producing a sterically regulated methacrylic polymer according to claim 7, wherein the polymerization is carried out at a temperature of −100 to 40° C.

* * * * *